United States Patent
Dimou et al.

(10) Patent No.: US 11,304,073 B2
(45) Date of Patent: *Apr. 12, 2022

(54) USER EQUIPMENT AND METHODS FOR OPERATION IN COVERAGE ENHANCEMENT MODE WITH PHYSICAL RANDOM ACCESS CHANNEL PREAMBLE

(71) Applicant: Apple Inc., Cupertino, CA (US)

(72) Inventors: Konstantinos D. Dimou, San Francisco, CA (US); Gang Xiong, Beaverton, OR (US); Seunghee Han, San Jose, CA (US); Hong He, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,051

(22) Filed: Aug. 19, 2020

(65) Prior Publication Data

US 2020/0382970 A1 Dec. 3, 2020

Related U.S. Application Data

(63) Continuation of application No. 15/935,402, filed on Mar. 26, 2018, now Pat. No. 10,771,987, which is a
(Continued)

(51) Int. Cl.
*H04W 24/02* (2009.01)
*H04W 48/12* (2009.01)
(Continued)

(52) U.S. Cl.
CPC .......... *H04W 24/02* (2013.01); *H04W 24/08* (2013.01); *H04W 48/12* (2013.01);
(Continued)

(58) Field of Classification Search
CPC . H04W 24/02; H04W 24/08; H04W 74/0833; H04W 48/12; H04W 36/08; H04W 74/002

See application file for complete search history.

(56) References Cited

U.S. PATENT DOCUMENTS

| 9,456,405 B2 | 9/2016 | Dimou et al. |
| 2004/0152479 A1* | 8/2004 | Rainbolt ................ H04B 1/713 455/506 |

(Continued)

OTHER PUBLICATIONS

"U.S. Appl. No. 14/489,874, Non Final Office Action dated Feb. 1, 2016", 9 pgs.
(Continued)

*Primary Examiner* — Ivan O Latorre
(74) *Attorney, Agent, or Firm* — Kowert, Hood, Munyon, Rankin & Goetzel, P.C.

(57) ABSTRACT

Embodiments of a User Equipment (UE) to operate in accordance with a physical random access channel (PRACH) are disclosed herein. The UE may comprise hardware processing circuitry to determine a coverage enhancement category for the UE based on downlink channel statistics related to reception of downlink signals at the UE from an Evolved Node-B (eNB) and an uplink-downlink imbalance parameter related to uplink reception at the eNB. The hardware processing circuitry may be further to select, for use in a coverage enhancement mode, a PRACH preamble from a set of candidate PRACH preambles based on the determined coverage enhancement category for the UE. In some embodiments, at least some of the candidate PRACH preambles may span a different number of subframes.

20 Claims, 8 Drawing Sheets

Related U.S. Application Data continuation of application No. 15/264,956, filed on Sep. 14, 2016, now Pat. No. 9,973,944, which is a continuation of application No. 14/489,874, filed on Sep. 18, 2014, now Pat. No. 9,456,405.

(60) Provisional application No. 61/933,850, filed on Jan. 30, 2014, provisional application No. 61/933,840, filed on Jan. 30, 2014.

(51) Int. Cl.
| | | |
|---|---|---|
| *H04W 24/08* | (2009.01) | |
| *H04W 74/08* | (2009.01) | |
| *H04W 74/00* | (2009.01) | |
| *H04W 36/08* | (2009.01) | |

(52) U.S. Cl.
CPC ........ *H04W 74/0833* (2013.01); *H04W 36/08* (2013.01); *H04W 74/002* (2013.01)

(56) References Cited

U.S. PATENT DOCUMENTS

| | | | | |
|---|---|---|---|---|
| 2006/0067205 | A1* | 3/2006 | Jung | H04B 1/7156 370/203 |
| 2009/0278742 | A1* | 11/2009 | Mehta | H04B 1/713 342/374 |
| 2010/0110994 | A1* | 5/2010 | Ratsuk | H04L 5/0053 370/329 |
| 2010/0238825 | A1 | 9/2010 | Zhang et al. | |
| 2012/0207045 | A1 | 8/2012 | Pelletier et al. | |
| 2012/0258724 | A1 | 10/2012 | Kim et al. | |
| 2013/0089034 | A1 | 4/2013 | Acharya et al. | |
| 2013/0107828 | A1 | 5/2013 | Dinan | |
| 2013/0308473 | A1 | 11/2013 | Sun et al. | |
| 2013/0324182 | A1 | 12/2013 | Deng et al. | |
| 2014/0056244 | A1 | 2/2014 | Frenne et al. | |
| 2014/0226630 | A1 | 8/2014 | Comstock | |
| 2014/0328309 | A1 | 11/2014 | Comstock | |
| 2015/0016312 | A1 | 1/2015 | Li et al. | |
| 2015/0078224 | A1 | 3/2015 | Xiong et al. | |
| 2015/0131579 | A1 | 5/2015 | Li et al. | |
| 2015/0215911 | A1 | 7/2015 | Dimou et al. | |
| 2015/0334659 | A1 | 11/2015 | Dimou et al. | |
| 2016/0095076 | A1 | 3/2016 | Xiong et al. | |
| 2016/0226639 | A1 | 8/2016 | Xiong et al. | |
| 2016/0242229 | A1 | 8/2016 | Balachandran et al. | |
| 2017/0105127 | A1 | 4/2017 | Xiong et al. | |
| 2017/0134967 | A1 | 5/2017 | Dimou et al. | |

OTHER PUBLICATIONS

"U.S. Appl. No. 14/489,874, Notice of Allowance dated May 27, 2016", 8 pgs.

"U.S. Appl. No. 14/489,874, Response filed Apr. 28, 2016 to Non Final Office Action dated Feb. 1, 2016", 14 pgs.

"U.S. Appl. No. 15/264,956, Examiner Interview Summary dated Nov. 15, 2017", 3 pgs.

"U.S. Appl. No. 15/264,956, Non Final Office Action dated Aug. 21, 2017", 9 pgs.

"U.S. Appl. No. 15/264,956, Notice of Allowance dated Dec. 20, 2017", 9 pgs.

"U.S. Appl. No. 15/264,956, Preliminary Amendment filed May 2, 2017", 10 pgs.

"U.S. Appl. No. 15/264,956, Response filed Nov. 20, 2017 to Non Final Office Action dated Aug. 21, 2017", 18 pgs.

\* cited by examiner

USER EQUIPMENT AND METHODS FOR OPERATION IN COVERAGE ENHANCEMENT MODE WITH PHYSICAL RANDOM ACCESS CHANNEL PREAMBLE

PRIORITY CLAIM

This application is a continuation of U.S. patent application Ser. No. 15/935,402, filed Mar. 26, 2018, and titled "User Equipment and Methods for Operation in Coverage Enhancement Mode with Physical Random Access Channel Preamble", and which is a continuation of U.S. patent application Ser. No. 15/264,956, filed Sep. 14, 2016, now issued as U.S. Pat. No. 9,973,944, which is a continuation of U.S. patent application Ser. No. 14/489,874, filed Sep. 18, 2014, now issued as U.S. Pat. No. 9,456,405, which claims the benefit of priority under 35 U.S.C. 119(e) to U.S. Provisional Patent Application Ser. No. 61/933,840, filed Jan. 30, 2014, and to U.S. Provisional Patent Application Ser. No. 61/933,850, filed Jan. 30, 2014, each of which is incorporated herein by reference in its entirety. The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to cellular communication networks including LTE networks. Some embodiments relate to enhanced coverage communication. Some embodiments relate to physical random access channel operation according to a preamble.

BACKGROUND

A mobile device operating in a coverage area of a cellular system may often hand off between cells in order to optimize performance of the device or of the overall system. In some cases, however, a device beyond the coverage area may not be able to communicate effectively with the cell or to hand off to another cell despite being located in perhaps relatively close proximity to the network coverage area. In other cases, devices may simply lose network coverage for any number of reasons, and may have trouble reconnecting.

A device in such situations may harm the overall system performance by interfering with signals transmitted from other devices in the coverage area. In particular, the device that is out of coverage may attempt to reconnect to the network by transmitting uplink signals repeatedly and unsuccessfully. Accordingly, there is a general need for methods and techniques that enable reconnection to the network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
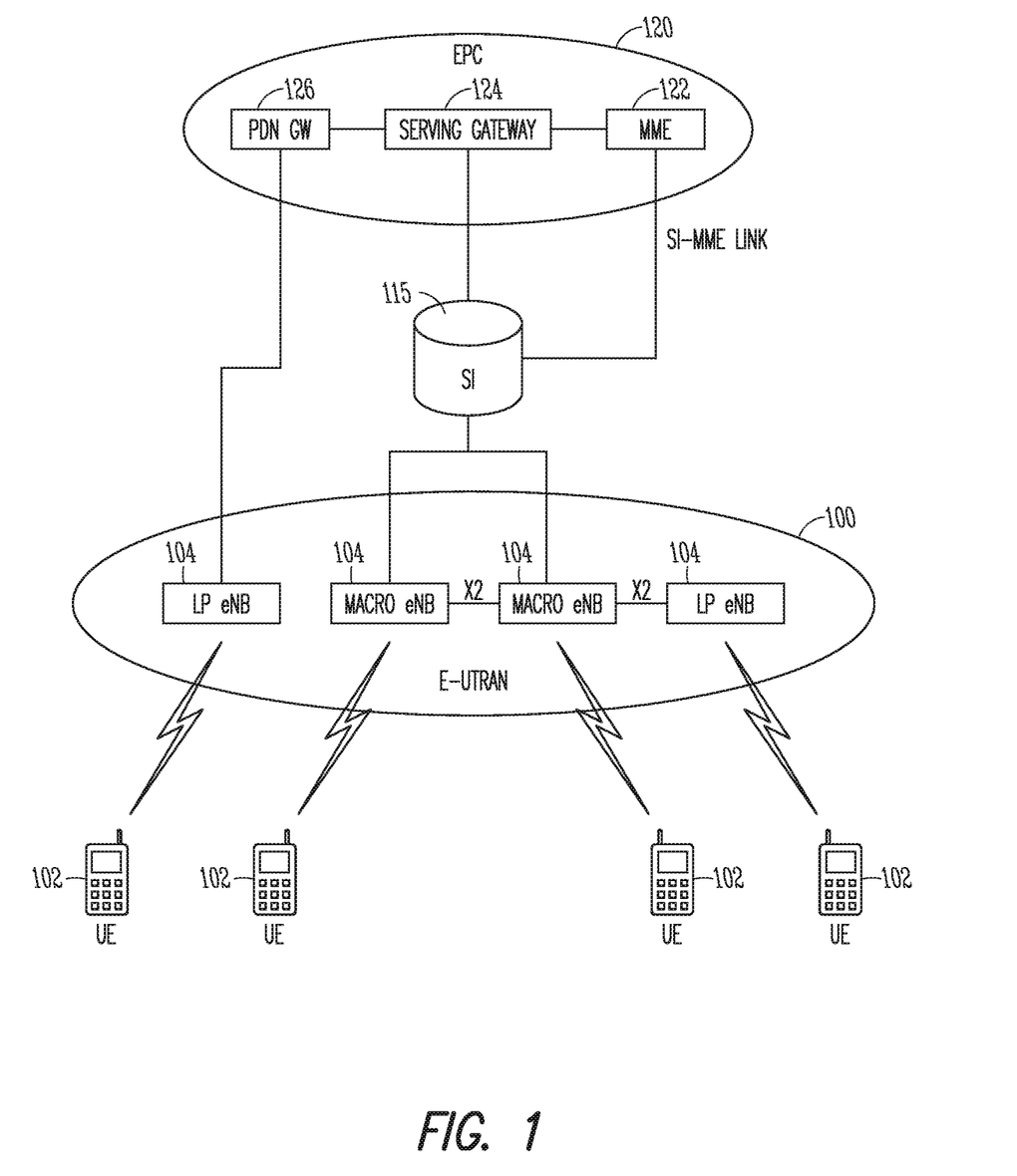
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
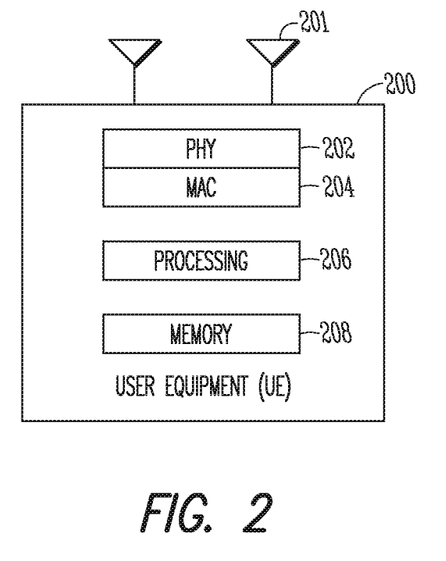
FIG. 2 is a functional diagram of a User Equipment (UE) in accordance with some embodiments.
Figure 3:
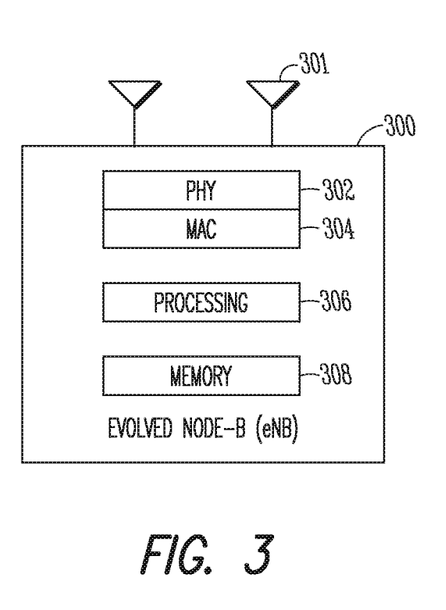
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 102 may operate in accordance with a physical random access channel (PRACH). The UE 102 may comprise hardware processing circuitry to determine a coverage enhancement category for the UE 102 based on downlink channel statistics related to reception of downlink signals at the UE 102 from the eNB 104 and an uplink-downlink imbalance parameter related to uplink reception at the eNB 104. The hardware processing circuitry may be further to select, for use in a coverage enhancement mode, a PRACH preamble from a set of candidate PRACH preambles based on the determined coverage enhancement category for the UE 102. In some embodiments, at least some of the candidate PRACH preambles may span a different number of sub-frames. These embodiments are described in more detail below.

In some cases, the UE 102 (or any mobile device) communicating with or as part of a cellular communication network may begin to experience performance degradation, particularly as it moves toward the edges of coverage cells. Typically, the UE 102 may engage in hand-off to another cell or sector of the network, a process which may begin long before the UE 102 actually reaches the edge of its serving cell. In some cases, however, the UE 102 naturally will lose coverage and may have issues reconnecting to the network. In other cases, the UE 102 may simply reach the edge of network coverage, where there may not be a cell or sector to engage in a hand-off.

In such cases, the UE 102 may attempt to reconnect to the network using a random access procedure, which may include transmission by the UE 102 on the PRACH. Transmission on the PRACH may include transmission of a PRACH preamble in the initial stages of the process, which may be transmitted in known or dedicated locations in the OFDM time-frequency resource grid previously described. The detection of any known preamble waveform, using correlation or other techniques, generally performs better for longer preambles. Accordingly, if multiple PRACH preambles of various lengths are available to the UE 102 for the reconnection procedure, the longer PRACH preambles may enable the UE 102 to reconnect to the network more quickly or reliably. However, the trade-off of this choice involves the amount of resources (resource elements in the OFDM time-frequency resource grid, for instance) consumed or used for the transmission of the longer PRACH preambles in comparison to the resources required for a transmission of a shorter PRACH preamble. As such, the choice of PRACH preamble length may be an important one. Similarly, multiple repetitions of the PRACH preamble may serve the same purpose and the choice of the number of repetitions may reflect similar trade-offs.

Figure 4:
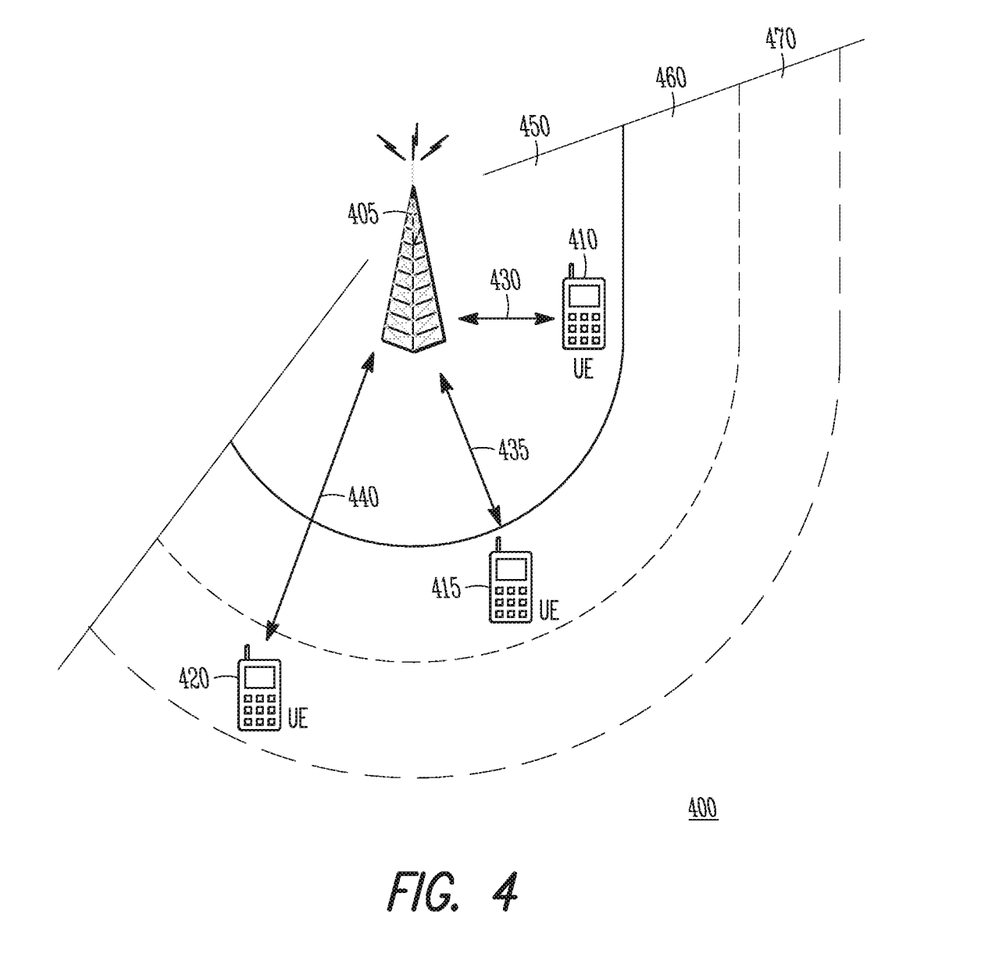
FIG. 4 is an example of a network connection scenario in accordance with some embodiments.

Referring to FIG. 4, an example of a connection scenario 400 is shown, in which a tower eNB 405 (which can be the eNB 104) and three UEs 410, 415, 420 (which can be the UE 102) located at various distances from the eNB 405 are operating, or attempting to operate, as part of an LTE network. It should be noted that the eNB 405 is not limited to the tower configuration and that scenarios described herein are not limited to the number or distribution of eNBs 405 or UEs 410, 415, 420 as shown in FIG. 4. The first UE 410 is in communication with the eNB 405 over the link 430, and is comfortably located within the coverage area 450 of the eNB 405. As such, it is expected that the first UE 410 may not be involved in a reconnection procedure. The second UE 415 is located outside of the coverage area 450 in a demarcated zone 460, and may be attempting a reconnection procedure over the link 435 (note the link may not actually be established or stable yet). Similarly, the third UE 420 is also located outside of the coverage area 450 in another demarcated zone 470 that is further away from the eNB 405 than the first demarcated zone 460. The third UE 420 may also be attempting a reconnection procedure over the link 440 (which may not actually be established or stable yet).

The second UE 415 and third UE 420 may be described as needing "coverage enhancement," or operating in "coverage enhancement mode," as they are out of the coverage area 450. Additionally, while both UEs 415, 420 are outside of the coverage area 450, the third UE 420 may have more trouble or challenges in reconnecting than would the second UE 415, as the third UE 420 is further away from the eNB 405. Accordingly, it may be possible to formulate different categories of coverage enhancement for UEs depending on how far out of coverage they are located or other factors. In some embodiments, descriptions may be used in the categories. For instance, the third UE 420 may be considered in a "high" category of coverage enhancement mode while the second UE 415 may be considered in a "low" category of coverage enhancement mode. In some embodiments, the categories may be numerical, such as 5 dB, 10 dB, and 15 dB, which may represent an additional amount of link budget that would have to be added to the UEs 415, 420 in order to realize a "normal operation." The normal operation may be characterized by any suitable criteria such as a target packet error rate, acquisition time, data throughput or the like.

It should be pointed out that the above discussion focuses on path loss due to distance only, for purposes of illustration, but this is not limiting. It is known in the art that path loss, signal loss, coverage holes or the like may result from effects other than distance, such as obstacles or indoor location. For instance, a device located in a basement of a building close to the eNB 405 may actually be in need of a coverage enhancement while another device located much further away, but outdoors, may have a stronger connection to the eNB 405 and may be in need of less or no coverage enhancement.

Figure 5:
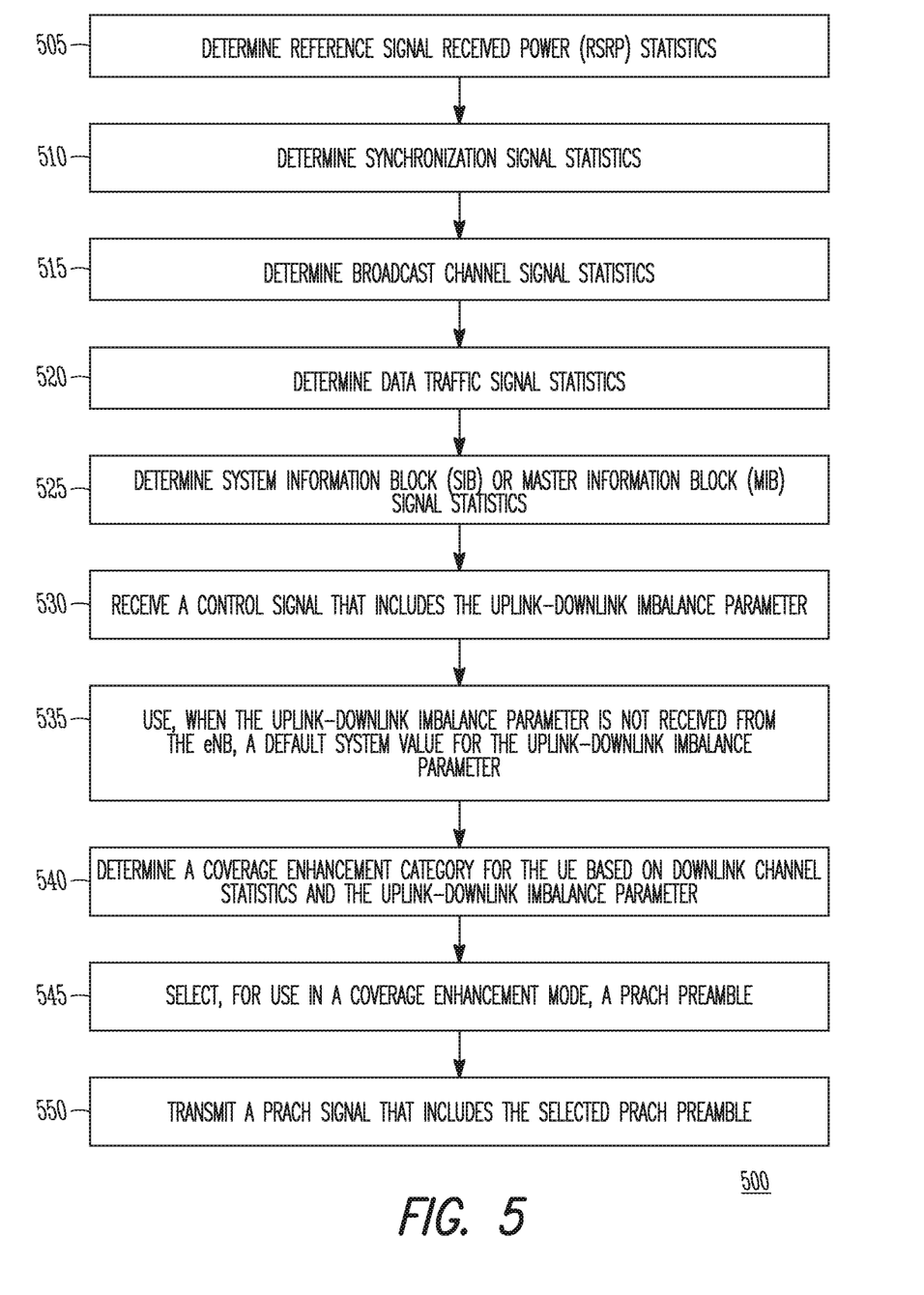
FIG. 5 illustrates the operation of a method for communicating with a random access channel in accordance with some embodiments.

Referring to FIG. 5, a method 500 of communicating over a PRACH channel is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-9, although it is understood that the method 500 may be practiced with any other suitable systems, interfaces and components. For example, reference may be made to the connection scenario 400 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, reference signal received power (RSRP) statistics related to the reception of a reference signal at the UE 102 may be determined. Synchronization signal statistics related to the reception of a synchronization signal at the UE 102 may be determined at operation 510. Broadcast channel signal statistics related to the reception of a broadcast channel signal at the UE 102 may be determined at operation 515, while data traffic signal statistics related to the reception of a data traffic signal at the UE may be determined at operation 520. At operation 525, system information block (SIB) or master information block (MIB) statistics related to the reception of an SIB or MIB at the UE 102 may be determined.

It should be noted that the downlink channel statistics determined at these and other operations may include any suitable statistics known in the art, including power measurements of received signals, signal-to-noise ratios (SNR), carrier-to-interference ratios (C/I) or the like at the UE 102. In addition, although reference may be made to reception of a signal in a determination of statistics, it is understood that the determination may be based on reception of more than one of the appropriate signals. For instance, the RSRP statistics may be related to reception of multiple or a series of reference signals at the UE 102 during different time periods. The downlink channel statistics may include average values, peak values, histograms or any other suitable statistical values or measures, and may also include acquisition times related to synchronization operations or signals, including durations or average durations. The downlink channel statistics may be related to signals received at the UE 102 on the downlink from the eNB 104, and accordingly, may provide insight into the quality of the uplink, or a potential uplink, between the UE 102 and the eNB 104 in some sense.

In some embodiments, the RSRP statistics may include average power measurements taken on cell-specific reference signals (RS) in LTE networks. In some embodiments, operation 505 may include determination of reference signal received quality (RSRQ) measurements when appropriate, as known in the art of 3GPP. These embodiments are not limiting, however, as operation 505 may include determining average power measurements or other statistics on any type of reference signal or pilots received at the UE 102.

The synchronization signals may include either or both of a primary synchronization signal (PSS) and a secondary synchronization signal (SSS) as known in 3GPP protocols, and may also include other synchronization signals in addition to or instead of the PSS and SSS. In some embodiments, the synchronization signal statistics may include average power measurements, which may be related to a data portion, pilot portion or other portion of a synchronization signal. For instance, for OFDM signals, a set of OFDM resource elements (REs) may be used, and the set may include data REs, pilot REs, other REs or a combination thereof. In some embodiments, synchronization signal statistics may include an acquisition time. For instance, the elapsed time between an initial detection of the PSS or SSS at the UE 102 and the synchronization of the UE 102 with the PSS or SSS may be determined.

The broadcast channel signal statistics, data traffic signal statistics, SIB statistics or MIB statistics may be determined using techniques similar to those described above regarding the RSRP and synchronization signal statistics. The statistics may be related to reception of signals on physical broadcast channel (PBCH), physical downlink shared channel (PDSCH) or other channels known in 3GPP protocols. In addition, the downlink channel statistics may include some or all of the statistics described as part of operations 505-525, and may also include combinations of the statistics. As an example, average power measurements included in the synchronization signal statistics and data traffic signal statistics may be averaged to produce another average power measurement that may be improved, in some cases, due to the presence of more samples. Such averaging operations may also include the use of weighting to give more weight to measurements that may be more reliable. For instance, measurements of the average power for the PSS or SSS may be more reliable than those for the data traffic signal if the PSS or SSS is transmitted from the eNB 104 at a higher power level than the data traffic signal, and the measurements may be assigned larger weighting as a result.

In some embodiments, downlink channel statistics related to reception of signals other than the reference signal may be used when it is determined that the RSRP statistics are not reliable, for instance if the number of collected RSRP samples is determined as too low for statistical significance.

These embodiments are not limiting, however, and any appropriate control logic may be used to determine which of the previously described downlink channel statistics are used along with appropriate weightings.

At operation 530, a control signal that includes an uplink-downlink imbalance parameter may be received at the UE 102. At operation 535, when the uplink-downlink imbalance parameter is not received from the eNB 104 as part of the control signal or otherwise, a default system value for the uplink-downlink imbalance parameter may be used to perform other operations in the method 500.

The uplink-downlink imbalance parameter may refer to or characterize uplink reception at the eNB 104, and may be a characteristic that does not change dynamically. It may be related to feeder losses, antenna configuration or mounting characteristics at the eNB 104, and may be different for different eNBs (104 or others) to which the UE 102 may wish to communicate. As an example, the antenna of the eNB 104 may be connected via heavy cables to a cabinet that houses the circuitry, power supplies and other components of the eNB 104. The cable loss may be significant, or at least non-negligible in a link budget, particularly when the antenna is mounted on a high tower and the cabinet is located on the ground. In contrast, a second eNB may be configured such that the antenna is located much closer to the cabinet, and may not experience the same amount of cable loss.

At operation 540, a coverage enhancement category for the UE 102 may be determined based on any or all of the previously described downlink channel statistics and the uplink-downlink imbalance parameter. The determination may include the use of thresholds, such as power level thresholds or acquisition time thresholds or other suitable thresholds related to the downlink channel statistics or the uplink-downlink imbalance parameter. As previously described, a coverage enhancement category may reflect a level of additional link margin or system resources for performance at or above a performance threshold associated with a normal operating mode for the UE 102. The normal operating mode may be determined or characterized according to any suitable criteria such as a target packet error rate, acquisition time, data throughput or the like. In some embodiments, the categories may be descriptive, such as "high" and "low." In some embodiments, the categories may be numerical, such as 5 dB, 10 dB, and 15 dB, which may represent an additional amount (per estimates or approximations) of link budget that would have to be added to the UEs 415, 420 in order to realize the normal operating mode. The number of categories is not limited by these examples, and can be any suitable number.

In some embodiments, a set of power level thresholds may be compared to a sum that includes any or all of the average power levels and the uplink-downlink imbalance parameter included in the downlink channel statistics. As an example, the set of power level thresholds may include reception level boundaries such as −105, −110, and −115 dBm, which may be compared to an average power level adjusted by the uplink-downlink imbalance parameter. The resulting value may be quantized into one of the levels −105, −110 or −115 dBm, which may be mapped into coverage enhancement categories such as 5, 10, and 15 dB, or "low," "medium," and "high" coverage enhancement modes. Similar comparisons may be made using weighting or in a different order than in the previous example. For instance, the average power level may be compared to the thresholds to produce a category of coverage enhancement, and the uplink-downlink imbalance parameter may be applied after the fact to produce an adjusted category of coverage enhancement. The uplink-downlink imbalance parameter may also be used to adjust the set of power level thresholds before comparison with the average power level.

In another example, the synchronization acquisition time previously mentioned may be compared with acquisition time thresholds of 250, 750, and 1250 msec to produce coverage enhancement categories such as 0-500 msec, 500-1000 msec, and 1000-1500 msec, or "low," "medium," and "high" coverage enhancement modes. In another example, multiple power level threshold comparisons may be performed with different average power levels of the downlink channel statistics to produce multiple results for the coverage enhancement category. The previous acquisition time example may also be included to provide another result for the coverage enhancement category. The determination of the coverage enhancement category may include using any of these results or using majority voting or similar techniques.

It should be noted that the power level thresholds, acquisition time thresholds or other thresholds may be broadcast by the system in control messages, may be included as part of a default or other implementation at the UE 102 or may be part of a standard.

At operation 545, a PRACH preamble may be selected for use in a coverage enhancement mode. The selection may be based on the determined coverage enhancement category for the UE 102, and may include selecting the PRACH preamble from a set of candidate PRACH preambles. Such a set may include candidate PRACH preambles of different lengths in terms of the number of sub-frames spanned, number of OFDM symbol periods spanned or other appropriate time period unit.

As an example, the set of candidate PRACH preambles may include a first PRACH preamble that spans one sub-frame, a second PRACH preamble that spans two sub-frames, and a third PRACH preamble that spans three sub-frames. In some embodiments, the largest candidate coverage enhancement category may be associated with one or more of the PRACH preambles spanning the largest number of sub-frames while the smallest candidate coverage enhancement category may be associated with one or more of the PRACH preambles spanning the smallest number of sub-frames. As an example, the previously described coverage enhancement categories of 5, 10, and 15 dB may be associated with PRACH preambles that span one, two, and three sub-frames respectively. These examples are not limiting, however, as PRACH preambles of any suitable size may be used, including PRACH preambles longer than three sub-frames or of lengths that are not an integer number of sub-frames.

The coverage enhancement category may also be used to select a number of diversity repetitions of the PRACH preamble. For instance, a PRACH preamble that spans one sub-frame may be transmitted one, two or three times (or any appropriate number) for coverage enhancement categories previously described, such as low, medium, and high or 0, 5, and 10 dB.

In addition, the selection of the PRACH preamble may not necessarily need to include the use of coverage enhancement categories. In some embodiments, techniques previously described may be modified or applied accordingly to enable the selection of the PRACH preamble without the use of coverage enhancement categories. As an example, outcomes of previous operations, such as comparisons of downlink channel statistics and the uplink-downlink imbalance parameter with appropriate thresholds, may be used directly in the selection of the PRACH preamble.

At operation 550, a PRACH signal that includes the selected PRACH preamble may be transmitted by the UE 102. The transmission may be performed as part of a connection process, reconnection or hand-off process, but is not limited as such, and may be performed as part of any random access procedure. In some embodiments, the selected PRACH preamble may be transmitted according to a number of determined diversity repetitions, as previously described.

Figure 6:
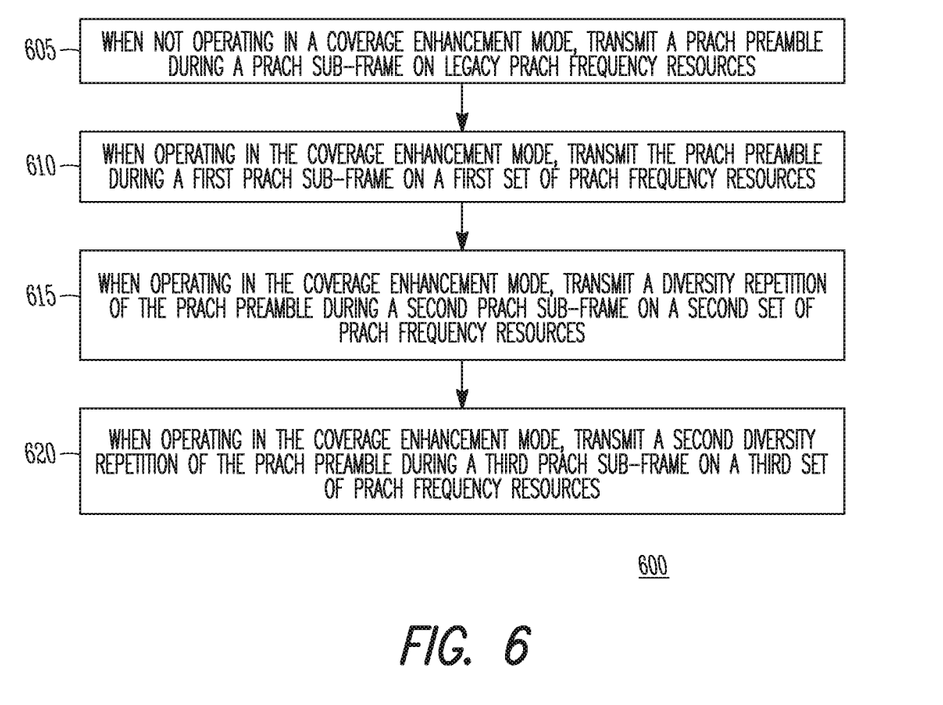
FIG. 6 illustrates the operation of a method for communicating with a random access channel in accordance with some embodiments.

Referring to FIG. 6, a method 600 of communicating over a PRACH channel is shown. As mentioned previously regarding the method 500, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5 and 7-9, although it is understood that the method 600 may be practiced with any other suitable systems, interfaces and components. For example, reference may be made to the connection scenario 400 in FIG. 4 described earlier for illustrative purposes, but the techniques and operations of the method 600 are not so limited. In addition, embodiments of the method 600 may refer to eNBs 104, UEs 102, APs, STAs or other wireless or mobile devices.

At operation 605, a PRACH preamble may be transmitted on legacy PRACH frequency resources during a PRACH sub-frame on legacy PRACH frequency resources when the UE 102 is not operating in a coverage enhancement mode. Accordingly, the legacy frequency resources may also be used by legacy UEs that do not support coverage enhancement in performance of random access procedures. Similarly, other UEs that may support coverage enhancement but are not currently operating in coverage enhancement mode may also use the legacy frequency resources for PRACH preamble transmission as part of random access procedures.

At operation 610, when the UE 102 is operating in the coverage enhancement mode, the PRACH preamble may be transmitted during a first PRACH sub-frame on a first set of PRACH frequency resources. At operation 615, when the UE 102 is operating in the coverage enhancement mode, a diversity repetition of the PRACH preamble may be transmitted during a second PRACH sub-frame on a second set of PRACH frequency resources. The operations 610, 615 may be performed by the UE 102 as part of the same random access communication. Accordingly, PRACH preamble diversity may be performed by transmission of two copies of the PRACH preamble in different frequency resources.

However, the diversity transmission is not limited to a single diversity copy, as any suitable number of diversity copies of the PRACH preamble may be transmitted as deemed appropriate through simulation or system analysis. The diversity copies may be distributed such that some of them are transmitted on legacy frequency resources and some of them are transmitted on the frequency resources reserved for UEs in coverage enhancement mode.

In addition, while reference is made to repetition of PRACH preambles in the method 600, it is understood that the techniques may be applied to longer PRACH preambles as well. For instance, a technique that addresses the transmission of two copies of a PRACH preamble that spans one sub-frame may also be applied to the transmission of a single copy of a PRACH preamble that spans two sub-frames by dividing the longer PRACH preamble into two pieces that each span a single sub-frame.

In some embodiments, at least the first set of PRACH frequency resources may be reserved for PRACH preamble transmission by UEs operating in the coverage enhancement mode. In some embodiments, the second set of PRACH frequency resources may include at least a portion of the legacy PRACH frequency resources, while in some embodiments, the second set of PRACH frequency sources may be exclusive to the legacy PRACH frequency resources.

As an example, in some cases, the system may allocate certain frequency resources for PRACH preamble transmission by legacy UEs or by UEs not operating in coverage enhancement mode. It may be expected that these UEs only need to transmit a single copy of the PRACH preamble for successful reception at the eNB 104. In contrast, UEs operating in coverage enhancement mode may need to transmit two or more copies of the PRACH preamble (or longer PRACH preambles) in order to achieve successful reception at the eNB 104. That is, the additional diversity gain may counteract a shortfall in link margin associated with being in coverage enhancement mode.

Accordingly, it is expected that the system may need to allocate a significant amount of additional frequency resources in order to support coverage enhancement mode. In some embodiments, the additional frequency resources may be exclusive to those allocated for legacy UEs and UEs not in coverage enhancement mode. However, a saving in the amount of frequency resources dedicated for total PRACH preamble transmission in the system may be realized by allowing overlap of the allocations described above. So in other embodiments, the UEs operating in coverage enhancement mode may have their own frequency resources available for PRACH preamble transmission (first set) and may also be permitted to utilize the frequency resources allocated for legacy UEs and UEs not in coverage enhancement mode (second set).

Figure 7:
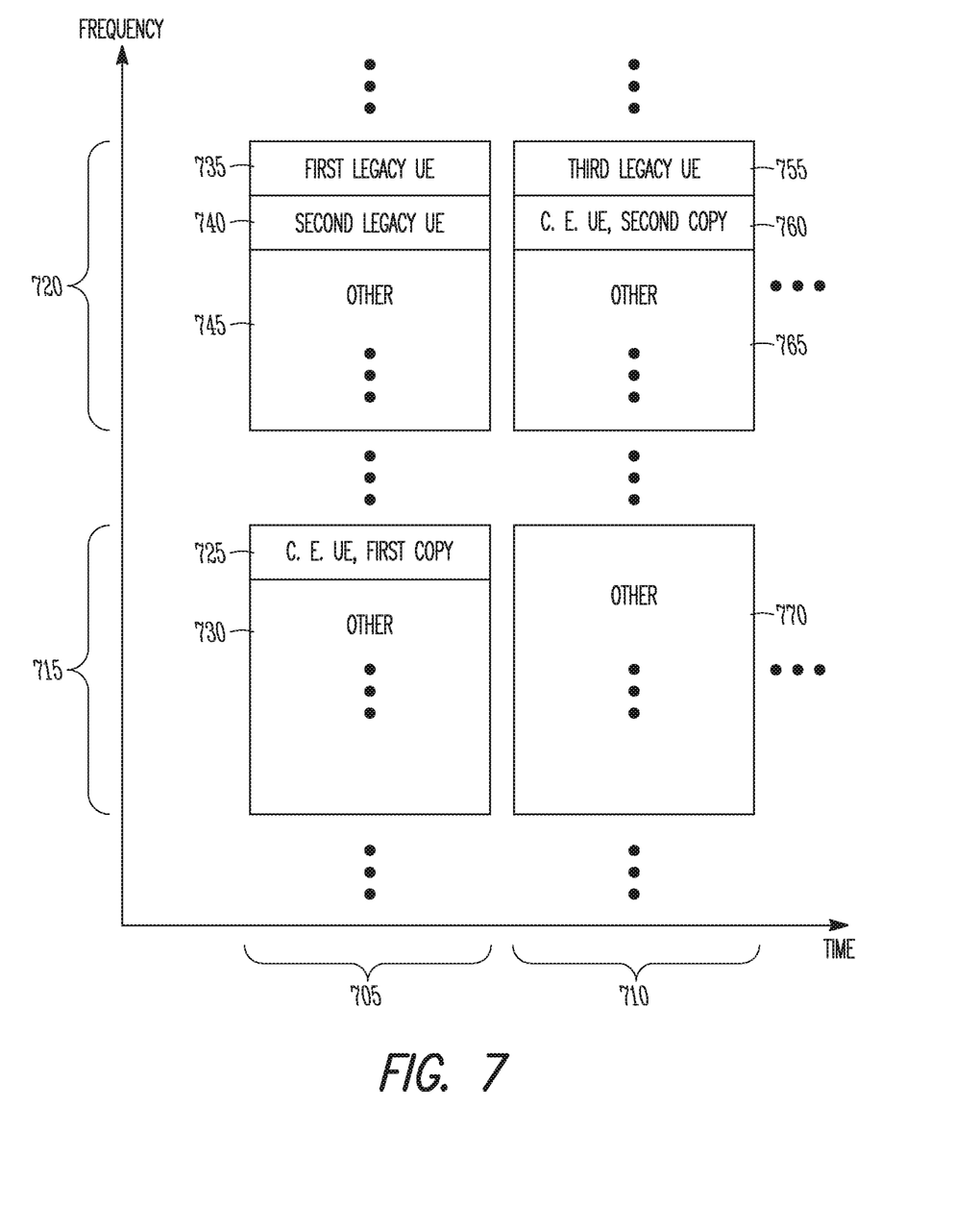
FIG. 7 illustrates an example of allocation of frequency resources for UEs performing random access procedures in accordance with some embodiments.

Referring to FIG. 7, an example is shown in which first frequency resources 715 and second frequency resources 720 are allocated for PRACH preamble transmission during a first sub-frame 705 and a second sub-frame 710. In this case, both the first frequency resources 715 and second frequency resources 720 are available to UEs that are operating in coverage enhancement mode. However, legacy UEs and UEs not operating in coverage enhancement mode may only transmit on the second frequency resources 720. The example shows single PRACH preamble transmissions in the second frequency resources 720 by a first legacy UE 735, a second legacy UE 740, and a third legacy UE 755. In addition, a single UE in coverage enhancement mode transmits a first copy 725 and a second copy 760 of its PRACH preamble during the two different sub-frames 705 and 710, respectively. Note that in some cases, the system may not allocate every sub-frame for PRACH transmission, in which case the second sub-frame 710 may not be adjacent to the first sub-frame 705 in time. In any case, the example in FIG. 7 serves to illustrate the concepts, although different configurations may be employed depending on which time and frequency resources are allocated in the system. Note the portions labeled "OTHER" in FIG. 7 may support other UEs that are trying to perform random access procedures in the same time and frequency resources. Those transmissions may or may not collide with transmissions from other UEs as shown, depending on preamble code indices in accordance with 3GPP protocols, for example.

In some embodiments, a first frequency index may be associated with a first frequency location of the first frequency resources while a second frequency index may be associated with a second frequency location of the second frequency resources. For instance, the available frequency resources for UEs operating in coverage enhancement mode may include a number "N" of physical resource blocks (PRBs) and may be indexed as 0, 1, ... (N−1), each of which may support a copy of the PRACH preamble for a UE (and perhaps for other UEs also) during a sub-frame. The first and second frequency indices may each be determined from the numbers 0, 1, ... (N−1) during each sub-frame in which a copy of the PRACH preamble is transmitted. In some embodiments, the determination may be based on a frequency hopping pattern. As an example, the pattern may be generated according to a seed value that includes a first sub-frame index of the first PRACH sub-frame or a second sub-frame index of the second PRACH sub-frame. As another example, the frequency hopping pattern may be generated according to a system frame number (SFN) of a packet received at the UE.

Figure 8:
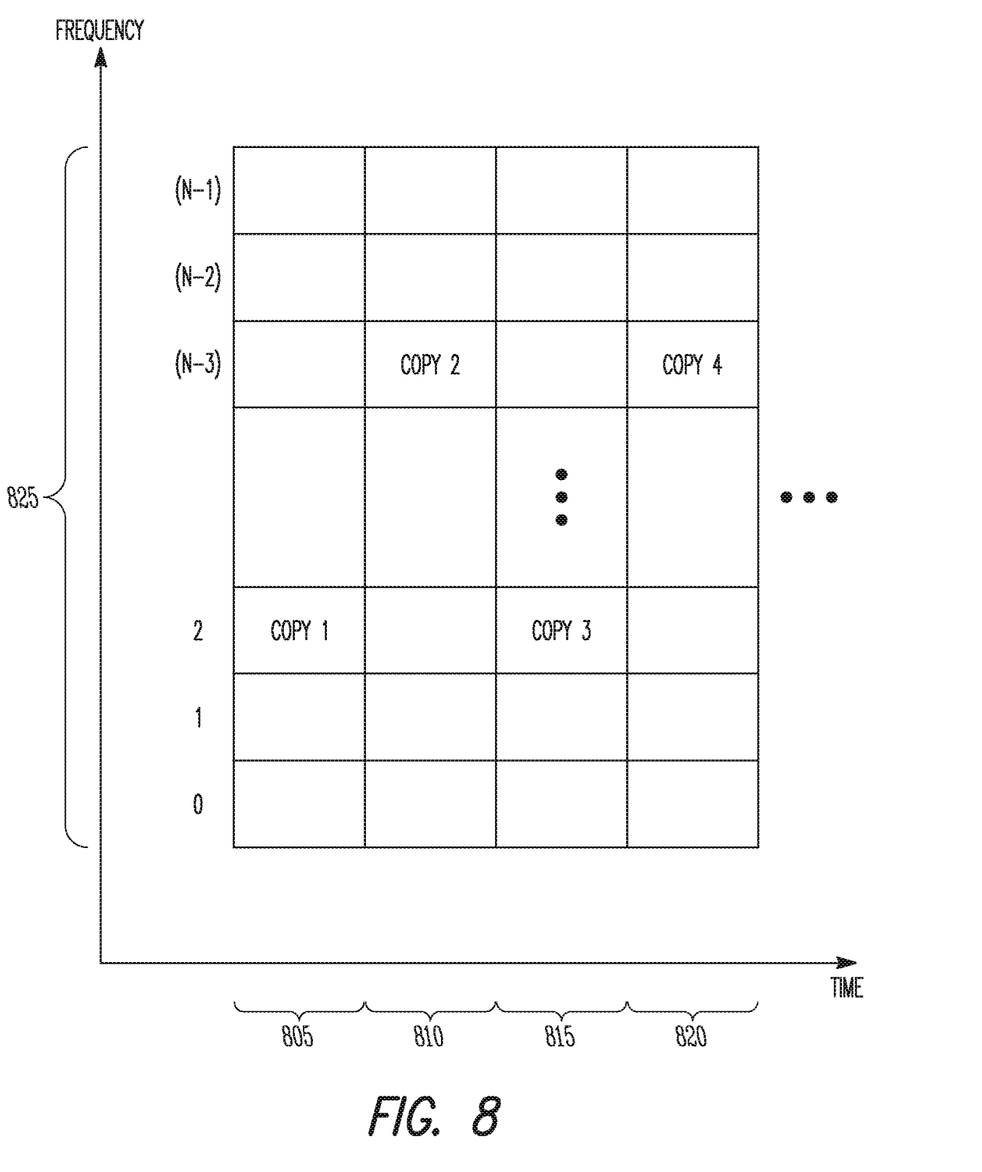
FIG. 8 illustrates an example of allocation of frequency resources for UEs performing random access procedures in accordance with some embodiments.

In some embodiments, the first and second frequency index may be determined by a mirror pattern according to the first sub-frame index and second sub-frame index. Accordingly, when the first and second sub-frame indices are adjacent in time (or at least adjacent in terms of those sub-frames allocated for PRACH preamble transmission), the second frequency index may be determined by subtracting the first frequency index from a total number of frequency indices in the mirror pattern. That is, if the first frequency index is "p," the second frequency index may be (N−p).

Referring to FIG. 8, an example shows transmission according to a mirror pattern, in which the PRBs allocated for PRACH preamble transmission are labeled 0, 1, ... (N−1). The example shows transmission for a value p=2, in which case the copies are alternated between the indices of "2" and (N−3). Again, it should be noted that the allocated sub-frames for PRACH preamble transmission may not be allocated adjacently in time in some cases.

Figure 9:
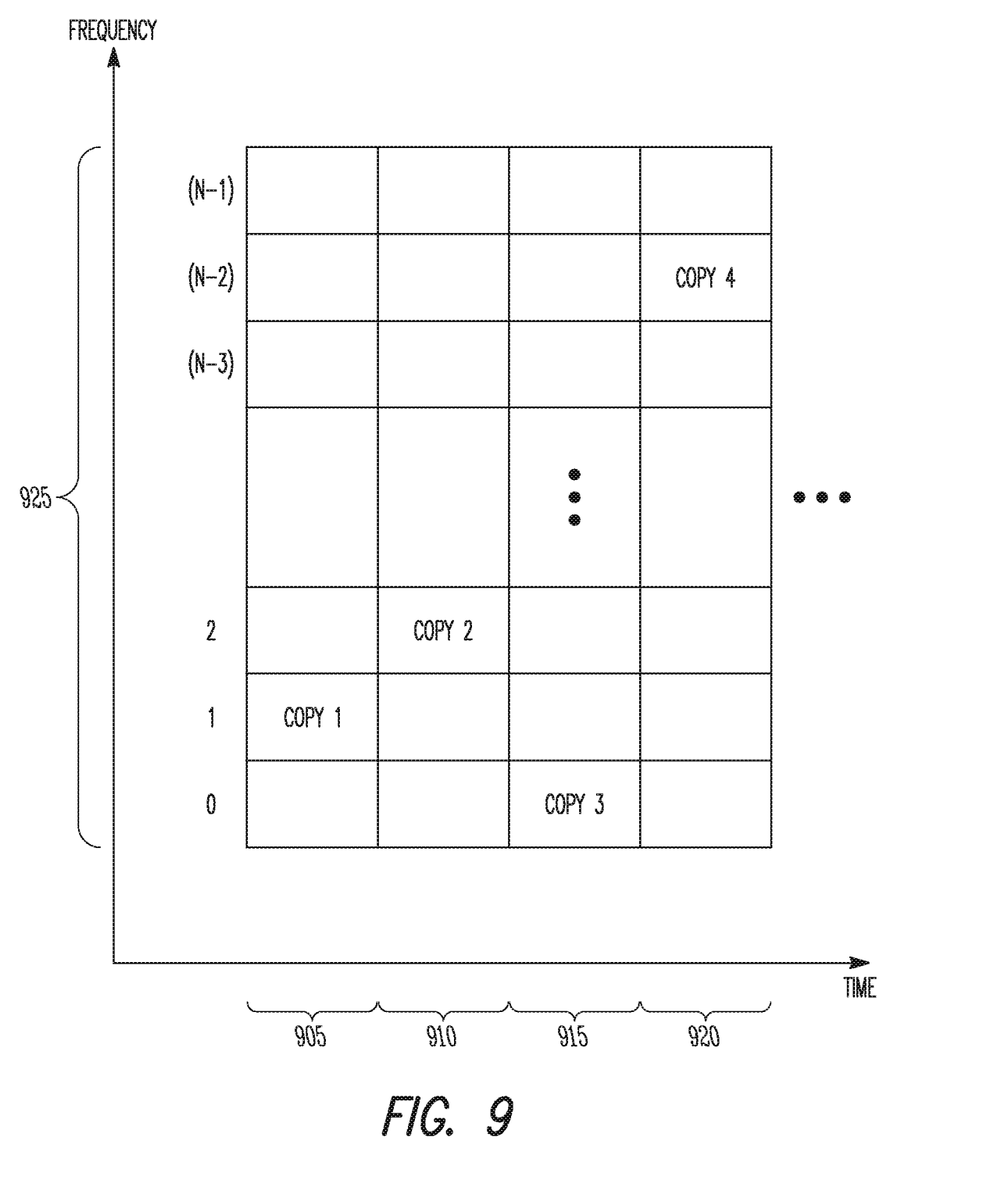
FIG. 9 illustrates an example of allocation of frequency resources for UEs performing random access procedures in accordance with some embodiments.

Referring to FIG. 9, an example shows transmission according to a frequency hopping pattern, in which the PRBs allocated for PRACH preamble transmission are labeled 0, 1, ... (N−1), and the hopping pattern has been determined as 1, 2, 0, (N−2). Any previously described techniques or others may be used to generate such a pattern.

It should be noted that the mirror pattern and frequency hopping patterns may refer to PRBs distributed according to indices 0, 1, ... (N−1), and that some of those indices may be reference frequency resources that are also available to legacy UEs in some embodiments. However, in other embodiments, all of the frequency resources referenced by those indices may be allocated to UEs operating in a coverage enhancement mode, although the scope of the embodiments is not limited in this respect.

A User Equipment (UE) to operate in accordance with a physical random access channel (PRACH) is disclosed herein. The UE may comprise hardware processing circuitry to determine a coverage enhancement category for the UE based on downlink channel statistics related to reception of downlink signals at the UE from an Evolved Node-B (eNB) and an uplink-downlink imbalance parameter related to uplink reception at the eNB. The hardware processing circuitry may be further to select, for use in a coverage enhancement mode, a PRACH preamble from a set of candidate PRACH preambles based on the determined coverage enhancement category for the UE. The hardware processing circuitry may be further to transmit a PRACH signal that includes the selected PRACH preamble. In some embodiments, at least some of the candidate PRACH preambles may span a different number of sub-frames.

In some embodiments, the coverage enhancement category for the UE may reflect a level of additional link margin or system resources for performance at or above a performance threshold associated with a normal operating mode for the UE. In some embodiments, the set of candidate PRACH preambles includes a first PRACH preamble that spans one sub-frame, a second PRACH preamble that spans two sub-frames, and a third PRACH preamble that spans three sub-frames. In some embodiments, the coverage enhancement category may be selected from a set of candidate coverage enhancement categories, the largest candidate coverage enhancement category may be associated with one or more of the PRACH preambles spanning the largest number of sub-frames, and the smallest candidate coverage enhancement category may be associated with one or more of the PRACH preambles spanning the smallest number of sub-frames. In some embodiments, the set of candidate coverage enhancement categories may include 5, 10, and 15 dB of additional link margin.

The hardware processing circuitry may be further to receive a broadcast control signal from the eNB that includes the uplink-downlink imbalance parameter. The hardware processing circuitry may be further to use, when the uplink-downlink imbalance parameter is not received from the eNB, a default system value for the uplink-downlink imbalance parameter in the determination of the coverage enhancement category.

In some embodiments, downlink channel statistics may include a reference signal received power (RSRP) related to the reception of a reference signal at the UE and the determination of the coverage enhancement category for the UE may be based on a comparison between a set of power level thresholds and a sum that includes the RSRP and the uplink-downlink imbalance parameter.

In some embodiments, the downlink channel statistics may include a synchronization average power level related to the reception of a synchronization signal at the UE and the determination of the coverage enhancement category for the UE may be based on a comparison between a set of power level thresholds and a sum that includes the synchronization average power level and the uplink-downlink imbalance parameter. In some embodiments, the downlink channel statistics may further include an RSRP related to the reception of a reference signal at the UE and the sum may further include the RSRP, and the sum is performed according to a set of weights for the RSRP and the synchronization average power level.

In some embodiments, the downlink channel statistics may further include a synchronization acquisition time related to the reception of the synchronization signal at the UE and the determination of the coverage enhancement category for the UE may be further based on a comparison between a set of acquisition time thresholds and the synchronization acquisition time.

In some embodiments, the downlink channel statistics may include at least one average power level of a set comprising a broadcast channel average power level related to the reception of a broadcast channel signal at the UE and a data traffic power level related to the reception of a data traffic signal at the UE. The determination of the coverage enhancement category for the UE may be based on a comparison between a set of power level thresholds and a sum that includes the at least one average power level of the set and the uplink-downlink imbalance parameter.

In some embodiments, downlink channel statistics may include at least one average power level of a set comprising a system information block (SIB) average power level related to the reception of an SIB at the UE and a master information block (MIB) average power level related to the reception of an MIB at the UE. The determination of the coverage enhancement category for the UE may be based on a comparison between a set of power level thresholds and a sum that includes the at least one average power level of the set and the uplink-downlink imbalance parameter.

A User Equipment (UE) to operate in accordance with a physical random access channel (PRACH) preamble is disclosed herein. The UE may comprise hardware processing circuitry to, when the UE is not operating in a coverage enhancement mode, transmit the PRACH preamble during a PRACH sub-frame on legacy PRACH frequency resources. The hardware processing circuitry may be further to, when the UE is operating in the coverage enhancement mode, transmit the PRACH preamble during a first PRACH sub-frame on a first set of PRACH frequency resources. The hardware processing circuitry may be further to, when the UE is operating in the coverage enhancement mode, transmit a diversity repetition of the PRACH preamble during a second PRACH sub-frame on a second set of PRACH frequency resources. In some embodiments, at least the first set of PRACH frequency resources may be reserved for PRACH preamble transmission by UEs operating in the coverage enhancement mode.

In some embodiments, the second set of PRACH frequency resources may include at least a portion of the legacy PRACH frequency resources. In some embodiments, the second set of PRACH frequency resources may be exclusive to the legacy PRACH frequency resources. In some embodiments, a first frequency index may be associated with a frequency location of the first PRACH frequency resources, a second frequency index may be associated with a frequency location of the second PRACH frequency resources, and the first and second frequency index may be included as part of a frequency hopping pattern. In some embodiments, the frequency hopping pattern may be generated according to a seed value that includes a first sub-frame index of the first PRACH sub-frame or a second sub-frame index of the second PRACH sub-frame. In some embodiments, the frequency hopping pattern may be generated according to a system frame number (SFN) of a packet received at the UE.

In some embodiments, a first frequency index may be associated with a frequency location of the first PRACH frequency resources, a second frequency index may be associated with a frequency location of the second PRACH frequency resources, and the first and second frequency index may be determined by a mirror pattern according to a first sub-frame index of the first PRACH sub-frame and a second sub-frame index of the second PRACH sub-frame. In some embodiments, when the first and second sub-frame indices are adjacent in time, the second frequency index may be determined by subtracting the first frequency index from a total number of frequency indices in the mirror pattern.

A non-transitory computer-readable storage medium that stores instructions for execution by one or more processors to perform operations for communicating in accordance with a physical random access channel (PRACH) is disclosed herein. The operations may configure the one or more processors to determine a coverage enhancement category for the UE based on downlink channel statistics related to reception of downlink signals at the UE from an Evolved Node-B (eNB) and an uplink-downlink imbalance parameter related to uplink reception at the eNB. The operations may further configure the one or more processors to select the PRACH preamble from a set of candidate PRACH preambles based on the determined coverage enhancement category for the UE. The operations may further configure the one or more processors to transmit a PRACH signal that includes the selected PRACH preamble. In some embodiments, at least some of the candidate PRACH preambles may span a different number of sub-frames.

In some embodiments, the coverage enhancement category for the UE may reflect a level of additional link margin or system resources for performance at or above a performance threshold associated with a normal operating mode for the UE. In some embodiments, the downlink channel statistics may include a synchronization average power level related to the reception of a synchronization signal at the UE and the determination of the coverage enhancement category for the UE may be based on a comparison between a set of power level thresholds and a sum that includes the synchronization average power level and the uplink-downlink imbalance parameter.

A method of communicating in accordance with a physical random access channel (PRACH) is disclosed herein. The method may comprise determining a coverage enhancement category for the UE based on downlink channel statistics related to reception of downlink signals at the UE from an Evolved Node-B (eNB) and an uplink-downlink imbalance parameter related to uplink reception at the eNB. The method may further comprise selecting the PRACH preamble from a set of candidate PRACH preambles based on the determined coverage enhancement category for the UE. The method may further comprise transmitting a PRACH signal that includes the selected PRACH preamble. In some embodiments, at least some of the candidate PRACH preambles may span a different number of sub-frames.

In some embodiments, the coverage enhancement category for the UE may reflect a level of additional link margin or system resources for performance at or above a performance threshold associated with a normal operating mode for the UE. In some embodiments, the downlink channel statistics may include a synchronization average power level related to the reception of a synchronization signal at the UE and determining the coverage enhancement category for the UE may include comparing a set of power level thresholds with a sum that includes the synchronization average power level and the uplink-downlink imbalance parameter.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus, comprising:
a processor configured to cause a user equipment (UE) to:
determine a physical random access channel (PRACH) configuration for an enhanced coverage (EC) mode;
determine system frame number (SFN) information;
transmit a plurality of repetitions of a PRACH preamble based on the PRACH configuration for the EC mode;
wherein subframes for transmission of the plurality of repetitions of the PRACH preamble are dependent on the PRACH configuration for the EC mode; and
wherein a frequency hopping pattern for the plurality of repetitions of the PRACH preamble is based on the system frame number (SFN) information.

2. The apparatus of claim 1, wherein the processor is further configured to:
limit starting subframes for the plurality of repetitions to a subset of subframes allowed for preamble transmission.

3. The apparatus of claim 1, wherein the processor is further configured to:
measure reference signals from a base station; and
determine an EC level based on reference signal received power (RSRP) measurements of the reference signals.

4. The apparatus of claim 3, wherein the processor is further configured to:
use PRACH resources dependent on the RSRP measurements.

5. The apparatus of claim 3, wherein the processor is further configured to:
decode a PRACH configuration from the base station that maps the EC levels and the PRACH resources.

6. The apparatus of claim 5, wherein the PRACH configuration maps the EC levels and the RSRP measurements.

7. The apparatus of claim 1, wherein the processor is further configured to:
encode the repetitions of the PRACH preamble with the frequency hopping pattern that uses PRACH frequency resources reserved for UEs operating in coverage enhancement mode.

8. The apparatus of claim 7, wherein the frequency hopping pattern is generated according to a seed value that includes a subframe index of a subframe in which one of the repetitions of the PRACH preamble is transmitted.

9. The apparatus of claim 1, wherein available EC frequency resources comprise:
N physical resource blocks (PRBs) that are each indexed with a frequency index of between 0 and (N−1), each of which supports one of the repetitions of the PRACH preamble;
a first frequency index is associated with a frequency location of PRACH frequency resources in a first subframe;
a second frequency index is associated with a frequency location of PRACH frequency resources in a second subframe; and
when the first and second subframe indices are adjacent in time, the second frequency index is determined by subtracting the first frequency index from a total number of frequency indices to form a mirror pattern.

10. The apparatus of claim 1, wherein an EC level is based on a static uplink-downlink imbalance parameter of a base station and the imbalance parameter is related to physical characteristics at the base station.

11. The apparatus of claim 10, wherein the imbalance parameter is related to at least one of feeder losses, an antenna configuration or mounting characteristics at the base station.

12. The apparatus of claim 10, wherein the processor is further configured to:
select the EC level based on a comparison between at least one of:
a set of power level thresholds and a sum that includes a synchronization average power level at the UE and the uplink-downlink imbalance parameter, the synchronization average power level related to reception of a synchronization signal at the UE,
a set of acquisition time thresholds and a synchronization acquisition time, the synchronization acquisition time related to reception of the synchronization signal, or
the set of power level thresholds and a sum that includes an average power level of a set of values and the uplink-downlink imbalance parameter.

13. The apparatus of claim 12, wherein the set of values comprises at least one of:
a broadcast channel average power level related to reception of a broadcast channel signal at the UE and a data traffic power level related to reception of a data traffic signal at the UE, or a system information block (SIB) average power level related to reception of an SIB at the UE and a master information block (MIB) average power level related to reception of an MIB at the UE.

14. A user equipment device (UE), comprising:
at least one antenna;
a radio operably coupled to the at least one antenna for communicating with a cellular network;
a processor operably coupled to the radio;
wherein the UE is configured to:
determine a physical random access channel (PRACH) configuration for an enhanced coverage (EC) mode;
determine system frame number (SFN) information;
transmit a plurality of repetitions of a PRACH preamble based on the PRACH configuration for the EC mode;
wherein subframes for transmission of the plurality of repetitions of the PRACH preamble are dependent on the PRACH configuration for the EC mode; and
wherein a frequency hopping pattern for the plurality of repetitions of the PRACH preamble is based on the system frame number (SFN) information.

15. The UE of claim 14, wherein the UE is further configured to:
limit starting subframes for the plurality of repetitions to a subset of subframes allowed for preamble transmission.

16. The UE of claim 14, wherein the UE is further configured to:
measure reference signals from a base station; and
determine an EC level based on reference signal received power (RSRP) measurements of the reference signals.

17. The UE of claim 16, wherein the processor is further configured to:
use PRACH resources dependent on the RSRP measurements.

18. A non-transitory computer-readable storage medium that stores instructions for execution by one or more processors to perform operations by a user equipment (UE), the operations to configure the UE to:
determine a physical random access channel (PRACH) configuration for an enhanced coverage (EC) mode;
determine system frame number (SFN) information;
transmit a plurality of repetitions of a PRACH preamble based on the PRACH configuration for the EC mode;
wherein subframes for the transmission of the plurality of repetitions of the PRACH preamble are dependent on the PRACH configuration for the EC mode; and
wherein a frequency hopping pattern for the plurality of repetitions of the PRACH preamble is based on the system frame number (SFN) information.

19. The medium of claim 18 wherein the instructions further cause the UE to:
limit starting subframes for the plurality of repetitions to a subset of subframes allowed for preamble transmission.

20. The medium of claim 18, wherein the instructions further cause the UE to:
measure reference signals from a base station;

determine an EC level based on reference signal received power (RSRP) measurements of the reference signals; and use PRACH resources dependent on the RSRP measurements.

* * * * *